(12) United States Patent
Kluge et al.

(10) Patent No.: US 12,393,814 B2
(45) Date of Patent: Aug. 19, 2025

(54) MARKING LABEL, MARKING SYSTEM AND METHOD FOR PRODUCING A MARKING LABEL

(71) Applicant: Schreiner Group GmbH & Co. KG, Oberschleissheim (DE)

(72) Inventors: Martin Kluge, Koenigsbrunn (DE); Melanie Achsnich, Munich (DE); Joseph Adelsberger, Langenpreising (DE); Frank Willner, Munich (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 0 days.

(21) Appl. No.: 18/720,059

(22) PCT Filed: Dec. 15, 2022

(86) PCT No.: PCT/EP2022/086103
§ 371 (c)(1),
(2) Date: Jun. 14, 2024

(87) PCT Pub. No.: WO2023/111162
PCT Pub. Date: Jun. 22, 2023

(65) Prior Publication Data
US 2025/0053770 A1    Feb. 13, 2025

(30) Foreign Application Priority Data
Dec. 17, 2021   (DE) ............ 10 2021 133 664.3

(51) Int. Cl.
*G06K 19/077* (2006.01)
*B29C 65/00* (2006.01)
(Continued)

(52) U.S. Cl.
CPC ........ *G06K 19/07728* (2013.01); *B29C 65/08* (2013.01); *B29C 66/0326* (2013.01);
(Continued)

(58) Field of Classification Search
None
See application file for complete search history.

(56) References Cited

U.S. PATENT DOCUMENTS 7,268,866 B2   9/2007   Messler
8,339,267 B2   12/2012  Phaneuf
(Continued)

FOREIGN PATENT DOCUMENTS

DE   36 02 991 A1    8/1987
DE   101 53 145 C1   2/2003
(Continued)

OTHER PUBLICATIONS

International Search Report in PCT/EP2022/086103, mailed Mar. 17, 2023.

*Primary Examiner* — Kristy A Haupt
(74) *Attorney, Agent, or Firm* — Collard & Roe, P.C.

(57) ABSTRACT

A marking label includes an RFID transponder with an RFID chip and an antenna structure which are coupled to one another by signal technology, and a sealing layer which covers the RFID transponder. The sealing layer is bonded to a substrate by welding so that the RFID chip and/or the antenna structure is surrounded by a weld seam and enclosed between the sealing layer and the substrate.

20 Claims, 7 Drawing Sheets

(51) Int. Cl.
*B29C 65/08* (2006.01)
*B29L 31/00* (2006.01)

(52) U.S. Cl.
CPC ...... *B29C 66/433* (2013.01); *G06K 19/07722* (2013.01); *B29L 2031/744* (2013.01)

(56) References Cited

U.S. PATENT DOCUMENTS

| | | |
|---|---|---|
| 8,643,492 B2 | 2/2014 | Marur et al. |
| 2004/0099744 A1* | 5/2004 | Cuperus ............. G06K 7/10316 |
| | | 235/491 |
| 2004/0182937 A1 | 9/2004 | Hiller |
| 2007/0051473 A1 | 3/2007 | Speich |
| 2017/0083809 A1* | 3/2017 | Forster ............. G06K 19/07762 |
| 2020/0134408 A1 | 4/2020 | Law |
| 2021/0276127 A1* | 9/2021 | Kumkar ............. B23K 26/0604 |

FOREIGN PATENT DOCUMENTS

| | | |
|---|---|---|
| DE | 101 58 095 A1 | 6/2003 |
| DE | 10 2006 053 471 A1 | 5/2008 |
| DE | 20 2009 012 901 U1 | 2/2010 |
| DE | 10 2019 127 537 A1 | 4/2021 |
| EP | 1 946 250 B1 | 7/2010 |
| WO | 2005/002992 A1 | 1/2005 |
| WO | 2009/049011 A1 | 4/2009 |

* cited by examiner

MARKING LABEL, MARKING SYSTEM AND METHOD FOR PRODUCING A MARKING LABEL

CROSS REFERENCE TO RELATED APPLICATIONS

This application is the National Stage of PCT/EP2022/086103 filed on Dec. 15, 2022, which claims priority under 35 U.S.C. § 119 of German Application No. 10 2021 133 664.3 filed on Dec. 17, 2021, the disclosure of which is incorporated by reference. The international application under PCT article 21(2) was not published in English.

The present invention relates to a marking label which enables reliable and durable marking of an object in a simple and cost-effective manner. The invention further relates to an marking system with such an marking label and a method for producing such an marking label.

Labels can be used for authorization or proof of origin and can be used wherever it is necessary to identify or verify objects. Some labels have electronic components, such as RFID transponders, which make it possible, for example, to conveniently locate and electronically record information on the labels and the information provided with them.

It is an objective of the invention to provide a marking label which can be produced in a simple and cost-effective manner and which enables reliable and durable identification of an object.

The objective is achieved by the features of the independent patent claims. Advantageous embodiments are given in the respective dependent patent claims.

According to an aspect of the invention, a marking label comprises an RFID transponder with an RFID chip and an antenna structure which are coupled to one another by means of signal technology, and a sealing layer which covers the RFID transponder. The sealing layer is bonded to a substrate by welding so that the RFID chip and/or the antenna structure is surrounded by a weld seam and enclosed between the sealing layer and the substrate.

The marking label can be used to securely and reliably electronically identify an object in a simple and cost-effective way. Due to the sealing weld seam, the marking label is reliably protected against unwanted external influences, for example in the form of moisture. For example, the marking label can be designed as an RFID label with a welded edge and used in the medical or pharmaceutical sector to identify syringes or containers that are usually treated using sterilization processes such as autoclaving. Due to the described structure of the marking label, the penetration of steam or liquid into the area of the RFID transponder is then reliably counteracted, so that the marking label remains on the object without significant impairment of its functionality.

It is a realization in connection with the present invention that conventional electronic labels with RFID functionality can suffer corrosion and loss of performance due to penetrating moisture. Despite the use of protective films, moisture can still penetrate laterally through layers of adhesive and reach the sensitive area of the RFID functionality and, sooner or later, adversely affect the functionality. The use of corresponding labels for products to be sterilized is therefore not possible or carries a high risk with regard to its functionality.

By means of the described identification label and the sealing weld seam, a moisture barrier is specifically provided so that the RFID functionality is retained even after autoclaving processes and reliable protection of the RFID transponder against chemical and/or physical influences is generally established.

According to an embodiment of the marking label, the RFID transponder comprises a carrier layer on which the RFID chip and the antenna structure are arranged and which forms the sealing layer, which is bonded to the substrate by means of the weld seam. Alternatively, such a carrier layer of the RFID transponder can form the substrate to which the sealing layer is bonded by means of the weld seam. The carrier layer is designed, for example, as a polyethylene (PE) or polyethylene terephthalate (PET) film element, which is bonded to the substrate by melting. In addition, other thermoplastics or plastics or materials in general are also possible, which can be bonded to a substrate by welding, sealing or melting. The carrier layer forms a component of the RFID transponder, which can also act as a sealing layer. Alternatively, the carrier layer can form a support for the RFID chip and the antenna and be covered by a separate sealing layer, which is set up as a film-based top layer, for example. Furthermore, the RFID transponder with the carrier layer can also be arranged and enclosed between these components in a freely movable, so to speak freely floating manner without a fixed coupling with the top layer or the sealing layer and/or the substrate.

Furthermore, the marking label can have an underlayer that forms the substrate to which the sealing layer is bonded by means of the weld seam. The bottom layer can be realized as a film element, such as a PET or PE film, and can be welded to the previously described carrier layer of the RFID transponder. If a top layer is also present, which forms the sealing layer, the bottom layer can be welded to the top layer and optionally also to the carrier layer and enclose the RFID transponder.

Preferably, the same types of film are welded together so that, for example, the sealing layer is formed as a PET film and the base layer as a bottom layer in the form of another PET film. Alternatively, different materials that can be welded together can also be used for the sealing layer and the substrate. For example, semi-crystalline and amorphous film types can also be mixed or bonded together. In each case, a composite of at least one meltable or sealable sealing layer with a substrate can be formed, which can also realize the carrier material of the RFID transponder. In addition, other layers can also be integrated into the structure of the marking label so that, for example, a multi-layer composite system with different functional layers can be realized.

The processed films of the sealing layer and/or the substrate have a thickness of 15 μm-500 μm, for example, in order to provide defined properties such as high flexibility, high resistance to mechanical influences or light protection. The thickness refers to a stacking direction transverse to a main extension plane of the marking label, whereby the stacking direction in a state applied to an object essentially corresponds to a surface normal of the object.

The previously described underlayer may form a component of the marking label or alternatively be associated with the object to which the marking label is to be applied. For example, the underlayer is formed by an already attached label or a film element, such as a shrink film, which is attached to a syringe. Accordingly, the label or the shrink film can form the underlayer, which is bonded to the sealing layer of the marking label by means of welding.

Alternatively, the object itself can also form the underlayer or the substrate to which the sealing layer of the marking label is bonded by welding. For example, a plastic syringe is provided, the surface of which forms a weldable substrate. The sealing layer can be attached to this substrate or to such a surface and bonded by welding. This means that the RFID chip and the antenna structure can be applied directly to a solid substrate or component using the carrier material or the sealing layer. The carrier material serves to self-protect the RFID transponder. The electronic marking label can therefore only be provided in a preliminary stage by the RFID transponder and the sealing layer and is formed as a final product by the adhesive welded connection with the intended substrate.

The marking label can be realized by means of a particularly simple and clear structure and does not require any additional barrier elements, protective bodies or additional layers in order to establish a reliable seal of the RFID functionality, in particular against moisture and corrosion. Corrosion due to excessive moisture occurs, for example, in the area of an RFID chip, which usually comprises a metal or metallic contacts. An antenna structure of an RFID transponder, which is formed by silver, aluminum or copper conductor tracks, for example, can also suffer significant functional losses due to corrosion. The marking label described can be used, for example, to create an elastic adhesive label that reliably counteracts the ingress of moisture and prevents corrosion or at least significantly reduces the risk of corrosion due to the material bonding of the RFID chip and/or the RFID antenna structure. It is therefore not necessary to protect the RFID functionality in a costly and time-consuming manner, for example by completely encapsulating it, which means that it is no longer as flexible and versatile as an elastic adhesive label.

According to a further embodiment of the marking label, the sealing layer is connected to the substrate by means of an adhesive layer, so that the adhesive layer is surrounded by the weld seam, at least in sections, and enclosed between the sealing layer and the substrate. In this way, the adhesive layer can also be protected from the effects of moisture and contributes to a reliable hold or cohesion of the components of the marking label. For example, the adhesive layer is applied locally to an underside of the sealing layer that faces the RFID transponder and the substrate. Such an adhesive layer can be provided in sections or form a self-contained ring or frame. Preferably, the adhesive layer is formed over the entire surface of the underside of the sealing layer, with the weld seam displacing the adhesive layer inwards or outwards in the bonded area during formation. The adhesive layer can therefore also be present in the area in which the weld seam and the bonded joint are formed. Alternatively or additionally, the adhesive layer or a further adhesive layer can be arranged outside the area of the weld seam in order to initially bond the sealing layer to the substrate with its adhesive edge areas and then form the weld seam within the adhesive area.

Preferably, the adhesive layer is provided in such a way that it is completely or largely recessed in an area of the joining zone in which the weld seam is formed. The joining zone can therefore be designed to be adhesive-free and enable reliable welding of the sealing layer to the substrate. The adhesive layer can only be formed in the inner area of the RFID antenna structure and be enclosed by the weld seam. Alternatively or additionally, the adhesive layer or another adhesive layer can be arranged in an outer edge area adjacent to the weld seam. The marking label can therefore have two or more adhesive sections that are separated by a specifically formed adhesive-free area. The area left free of adhesive is intended to form the weld seam and, in particular, is adapted to the shape of the RFID antenna structure. For example, the RFID antenna structure and the adhesive-free area are rectangular, square or circular. Alternatively, other geometric shapes can also be formed.

According to a further embodiment of the marking label, the weld seam runs along a label edge of the marking label and is self-contained. For example, the weld seam forms a ring or frame around the RFID transponder or at least around the RFID chip or the RFID antenna structure. For example, it can be useful to reliably seal the RFID chip as a sensitive electronic semiconductor component using the marking label so that different antenna structures can also be coupled with the welded RFID chip. The RFID chip often has a similar structure, while the antenna structure can have different geometries and structures depending on the application and functional specifications. The weld seam then extends over a section of the antenna structure that is connected to the RFID chip. However, even at such an overlap point, the weld seam is reliably formed and bonded to the antenna structure, which is made of silver, aluminum or copper, for example, or has silver, aluminum or copper.

The marking label can be assigned a stacking direction and a main extension plane, with the stacking direction essentially forming a perpendicular orientation to the main extension plane. The marking label is, in particular, like most labels, flat, so that a label width and a label length clearly predominate over a label thickness. The label width and the label length then span the main extension plane, while the label thickness follows the stacking direction. A top layer is then provided along the stacking direction, for example, followed by the RFID transponder with or without its own backing layer, followed by the bottom layer or the substrate.

The weld seam is preferably formed with a predetermined structural course in relation to the main extension plane and with a predetermined width, which for example has a value of 0.2 mm up to and including 10 mm. Such a weld seam can be formed easily and reliably, in particular by means of ultrasonic welding. Alternatively, the weld seam can also be formed using laser welding and may be even thinner or narrower and have a width of 0.1 mm. However, wider weld seams can also be formed by welding or sealing, so that the weld seam of the marking label can be wider than 10 mm. A predetermined wide weld seam forms a corresponding inherent stiffness of the welded joint and can contribute to an improved stiffness of the marking label and counteract undesired wrinkling of the marking label. The height or thickness of the weld seam can also be specified in accordance with the RFID functionality to be included.

The marking label can also be further designed in such a way that the weld seam has a predetermined 2D structure in relation to the main extension plane, for example with a wave structure, a zigzag structure and/or a waffle structure. In this way, an effective widening of the weld seam can also be set up, which increases the inherent stiffness and strength of the welded joint compared to a narrow straight weld seam and can contribute to an improved stiffness of the marking label and counteract undesirable wrinkling of the marking label. The described options for designing a 2D structure contribute to the stability of the marking label composite, for example to ensure that the marking label is later applied to or on an object without distortion. The weld seam can be formed in sections or can be sealed in a single operation.

The weld seam can be formed locally or circumferentially around the RFID chip and/or the antenna structure so that it and/or these are reliably sealed. Such a material-locking seal does not necessarily have to be self-sealing, but can also interact with one or more auxiliary elements and/or adjacent structures of the marking label and/or the substrate. At the very least, the material-locking connection by means of the weld seam formed between the sealing layer and the substrate contributes to a reliable enclosure of the RFID transponder or the RFID chip and/or the antenna structure.

According to a further embodiment of the marking label, the sealing layer and/or the substrate are pre-bent and bonded to each other by means of the weld seam, so that the marking label forms a predetermined curved marking medium. Accordingly, the weld seam can be formed with a predetermined 3D structure so that the shape of the marking label is adapted to the external shape of the object to be marked. Such an adaptation has a beneficial effect on the ease of application and reliable hold of the marking label, as compared to a flat label that is to be applied to a curved surface, restoring forces that would force the marking label into a flat position are reduced. For example, the marking label is formed by means of a sonotrode and an abutment in the form of an anvil using ultrasonic welding and is intended for use on cylindrical vessels, such as a syringe, which has a cylindrical syringe body. The anvil then has a particularly preferred contact surface with the sonotrode, which has a curvature that corresponds to the circumferential curvature of the tip body.

The marking label may further comprise a film element which is coupled to the RFID transponder and/or to the sealing layer and/or to the substrate and which is adapted to counteract moisture absorption into the enclosed area with the RFID chip and/or the antenna structure. For example, the sealing layer can be combined with a film material with special properties, which forms an upper material, an intermediate layer and/or an inlay substrate and establishes an additional barrier effect, e.g. against oxygen and/or water vapor and also against corrosive gases and/or liquids, or counteracts oxygen and/or moisture absorption or absorption of corrosive gases and/or liquids into the area of the RFID transponder.

According to a further embodiment, the marking label has a functional element which is connected to the RFID transponder and/or to the sealing layer and/or to the substrate or is attached or applied thereto and which is designed to form a mechanical protection for the RFID chip and/or the antenna structure. For example, an additional insertion of a fleece layer can provide mechanical protection for the RFID transponder. Alternatively or additionally, a foam element and/or a rubber-elastic film element can be provided, which acts as an upper and/or lower cover layer for the RFID transponder and forms part of the sandwich structure of the marking label.

The functional element and/or the film element described above can be arranged inside and/or outside the weld seam and can also be welded to the sealing layer if necessary. Reliable mechanical, physical and/or chemical protection can thus be established on the inside or in the area of the RFID transponder. On the outside or on the side of the weld seam opposite the RFID transponder, the functional element and/or the film element can act as a spacer to form a predetermined height of the marking label. Alternatively or additionally, a distance specification can also be realized on the inside, for example by arranging paint dots around the RFID chip and printing them on the carrier layer. Furthermore, a ferrite foil can be provided as a functional element in the marking label, which can contribute to improved RFID functionality of the RFID transponder even on a metallic substrate.

By processing the marking label with foils and/or functional layers, desired barrier properties and security features can be set up. Furthermore, processing of rubberized and non-gummed films for fixing or further processing of the marking label can be included in the label structure. The functional element can, for example, also be designed in the form of a void layer or comprise such a layer. The void layer provides a void effect that offers protection against tampering. For example, the void layer is realized with two or more differently adhesive structures or release gradations. For example, a more adhesive structure in the form of lettering is implemented in the void structure, while other sections of the void structure are less adhesive. If the void structure or the marking label with a void layer is applied to an object to be marked, the more adhesive lettering, for example, remains on the object when the marking label is removed, while the weaker adhesive sections are removed with the marking label or a label section that has been detached from the object. Alternatively, the structures described can also be designed inversely in terms of their adhesive strength, so that, for example, the structure in the form of lettering is less adhesive.

Alternatively or additionally, security features can be provided in the form of die-cuts that set up a predetermined weakening structure of a label layer of the marking label. In this way, for example, tear positions can be provided at which the marking label tears in a predetermined manner when tampering is attempted. Alternatively or additionally, perforations can also be provided in one or more layers of the marking label, which enable the respective layer to be cut through or torn open in a targeted manner.

According to a further embodiment of the marking label, the sealing layer and/or the substrate is designed as a transparent film element. A transparent film can be used to make the RFID transponder visible in the enclosed label structure and enable visual inspection. Alternatively or additionally, colored and/or non-transparent film elements can be provided to conceal the RFID transponder and the inner workings of the marking label.

According to a further aspect of the invention, a marking system comprises an embodiment of the marking label described above which is attached to an object. In particular, a surface of the object can form the substrate of the marking label to which the sealing layer is bonded by means of the weld seam. The surface of the object can, for example, be provided by an outer surface of a container which is made of weldable, fusible and/or joinable material. Alternatively, an element such as a film or a label, which is arranged on a surface of the object, can form a weldable substrate for the sealing layer.

In that the marking system comprises an embodiment of the described marking label, described properties and features of the marking label are also disclosed for the marking system and vice versa.

According to a further aspect of the invention, a method for producing a marking label comprises providing an RFID transponder comprising an RFID chip and an antenna structure which are coupled to each other by signal technology, and providing a sealing layer. The method further comprises attaching the RFID transponder and the sealing layer to a substrate so that the RFID chip and/or the antenna structure is arranged between the sealing layer and the substrate. The RFID transponder and the sealing layer can be attached simultaneously in one step or separately from one another. The method also comprises forming a weld seam by welding the sealing layer so that the RFID chip and/or the antenna structure is surrounded by the weld seam and enclosed between the sealing layer and the substrate.

The weld seam can be formed cost-effectively and quickly, in particular using ultrasonic welding. A sonotrode and an anvil can be used as welding tools and torsional and/or longitudinal ultrasonic welding can be carried out. By moving and vibrating the sonotrode, the material of the sealing layer can be melted in conjunction with the anvil as an abutment. The anvil and the sonotrode are arranged on opposite sides of the layers to be welded. The anvil can be a separate tool or the object itself, such as a syringe. In longitudinal ultrasonic welding, the sonotrode acts like a hammer that strikes the sealing layer to be welded and the substrate. In torsional ultrasonic welding, the sonotrode rubs along a predetermined path to form the weld seam. Alternatively or additionally, the weld seam can be formed using thermal welding and/or sealing and/or laser welding. Sealing can include heat sealing and cold sealing.

According to an embodiment of the method, the weld seam is formed by means of a sonotrode and an anvil, which have complementary curved surfaces facing each other during operation, so that the weld seam is formed with a predetermined curvature in relation to the stacking direction of the marking label. As a result, the marking label is formed with a predetermined curvature in relation to its main extension plane. The shape or working surfaces of the sonotrode and the anvil are preferably selected to correspond to an outer shape of the object to which the marking label is to be applied.

The method may further comprise performing a punching operation and/or a cutting operation and forming an outer contour of the marking label. The marking label is preferably formed in a plurality on a continuous web of material and processed as a label roll. The punching and/or cutting process can, in particular, be carried out at the same time as the welding of the sealing layer in a joint work step.

According to a further embodiment, the method comprises providing the substrate to which the sealing layer is welded in the form of a carrier layer of the RFID transponder and/or in the form of a sublayer and/or in the form of a surface of an object to be marked with the marking label. Several weld seams can also be formed in the ways described so that, for example, a top layer is welded as a sealing layer to the carrier layer of the RFID transponder and to a bottom layer that forms the substrate. In this way, a particularly reliable and secure encapsulation of the RFID transponder in the marking label can be established.

The fact that the respective method is set up in particular for producing an embodiment of the marking label described above means that properties and features of the marking label are also disclosed for the manufacturing method and vice versa.

A processing of a plurality of marking labels can be carried out in particular in a quasi-static, clocked roll-to-roll process with a pre- and post-run. Several sonotrodes can also be provided, which are clocked in rows, for example, in order to carry out several sealing processes simultaneously. The processing of a roll-to-roll process can thus be carried out with a dynamic change in the belt speed and a permanent introduction of vibrations via the sonotrodes. Alternatively, the roll-to-roll process can also be carried out continuously without a change in dynamics if, for example, the sonotrode and/or the anvil is designed as a roller sonotrode or roller anvil.

Processing can also take place in a piece goods process for fixed application to individual components. Processing of the inlay or the RFID transponder can also be set up to form a loose item and for loose insertion into a container, for example for tracking a total inventory on a pallet.

A processing frequency can be in the range of 20 kHz-100 kHz and, in particular, a combination of the welding process with a punching process can be set up in one work step. A separation process can take place upstream or downstream by carrying out a cutting process using a laser, an ultrasonic knife, a cutting knife, a rolling knife and/or a punching contour or a punching die.

Furthermore, positioning of the material to be welded, i.e. the sealing layer relative to the RFID transponder and/or relative to the substrate, can be provided via a web-shaped feed of the respective web material. A single application at defined points can also be set up. In connection with ultrasonic welding, the RFID transponder and the sealing layer can be positioned directly on the sonotrode by fixing the material to be welded via a vacuum on the sonotrode and/or on the anvil. Alternatively or additionally, a local or full-surface fixation of the weld metal on the substrate can be made possible by a rubber coating on the underside of the RFID transponder and/or the top layer and/or the bottom layer.

Using the manufacturing options described, an RFID inlay film can be reliably protected against moisture penetration and associated corrosion, for example by welding it to a top film or between two films with a material bond. Alternatively, the RFID transponder with a carrier layer can be fixed directly to a component by welding.

In the following, embodiments of the invention are explained with reference to schematic drawings. They show.

Elements or features of the same construction or function are marked with the same reference signs across the figures. For reasons of clarity, not all of the elements or features shown in all of the figures are marked with the corresponding reference signs.

FIGS. 1-4 each show a schematic side view of various embodiments of an electronic marking label 1. The marking label 1 has an RFID transponder 3 with an RFID chip 5 and an antenna structure 6, which are coupled to each other by means of signal technology. In addition, the marking label 1 comprises a sealing layer, which is realized as a separate top layer 2 (see FIGS. 1, 2 and 5) or as a carrier layer 4 of the RFID transponder 3 (see FIGS. 3 and 4). The sealing layer covers the RFID transponder 3 and is bonded to a substrate by welding, so that the RFID chip 5 and/or the antenna structure 6 is surrounded by a weld seam 7 and enclosed between the sealing layer and the substrate. The substrate is realized as a separate bottom layer 8 (see FIGS. 1 and 4), as a surface 13 of an object 10 (see FIG. 3) or as the carrier layer 4 of the RFID transponder 3 (see FIGS. 2, 5 and 6).

By means of the marking label 1, secure and reliable electronic marking of an object 10 can be set up in a simple and cost-effective manner. The marking label 1 is reliably protected against unwanted external influences, for example in the form of moisture, thanks to the sealing weld seam 7. The marking label 1 is designed, for example, as a sealed RFID label with a welded edge 12 and can be used in particular in the medical or pharmaceutical field to mark syringes or containers that are treated by means of sterilization processes, such as autoclaving. Due to the described structure of the marking label 1, the penetration of steam or liquid into the area of the RFID transponder 3 is then reliably counteracted, so that the marking label 1 remains on the object 10 without impairing its functionality.

Figure 1:
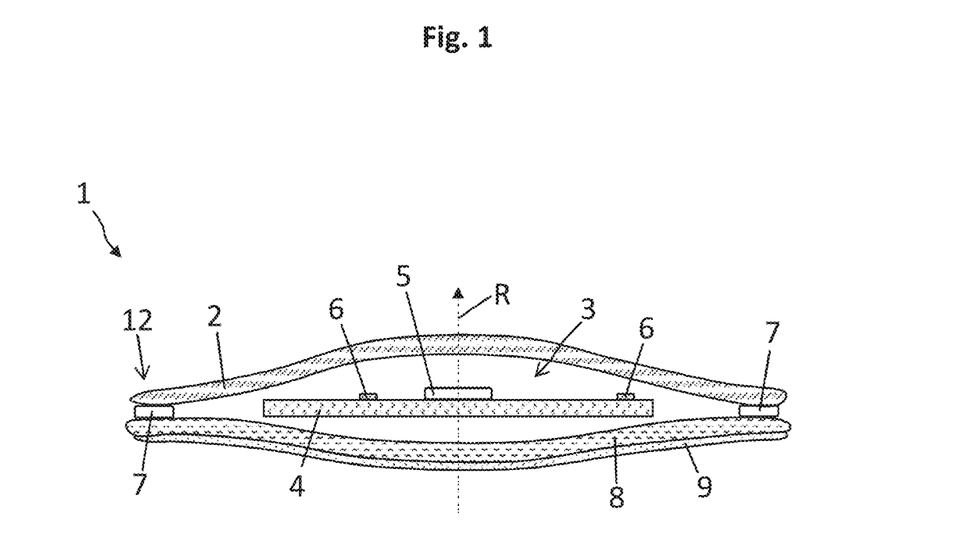
FIGS. 1-4 various embodiments of a marking label in respective side views.

The marking label 1 according to FIG. 1 has the bottom layer 8 as a substrate, which forms a lower cover layer or support for the RFID transponder 3 and/or the top layer 2. In this example, the top layer 2 forms the sealing layer. At a label edge 12 of the marking label 1, the top layer 2 and the bottom layer 8 are bonded to each other by means of the weld seam 7, so that the RFID transponder 3, which according to FIG. 1 comprises the RFID chip 5, the antenna structure 6 and the carrier layer 4, is welded into a kind of label pocket. Preferably, the RFID transponder 3 is coupled to the top layer 2 and/or the bottom layer 8 and fixed in position. Alternatively, the RFID transponder 3 with the carrier layer 4 can also be freely movable in the label pocket without being coupled to the top layer 2 and/or the bottom layer 8. Furthermore, the marking label 1 has an adhesive layer 9, which is arranged on an underside or outside of the bottom layer 8 and enables simple and reliable application of the marking label 1 to an object.

In this description, terms such as "top", "bottom", "top layer", "bottom layer" and "base" refer to an orientation and orientation of the components of the marking label 1 as illustrated in the figures. Furthermore, a stacking direction R of the marking label 1 is indicated, which corresponds to a vertical line in the figures. When applied to an object, the stacking direction R generally corresponds to a surface normal of the object surface to which the marking label 1 is attached. The bottom layer 8 therefore faces the object, while the sealing layer 2, 4 lies on top and faces away from the object.

The weld seam 7 forms a material bond between the top layer 2 and the bottom layer 8 and creates a sealing surface within which the RFID transponder 3 is arranged. The RFID transponder 3 forms an inlay that is completely enclosed or surrounded.

Figure 2:
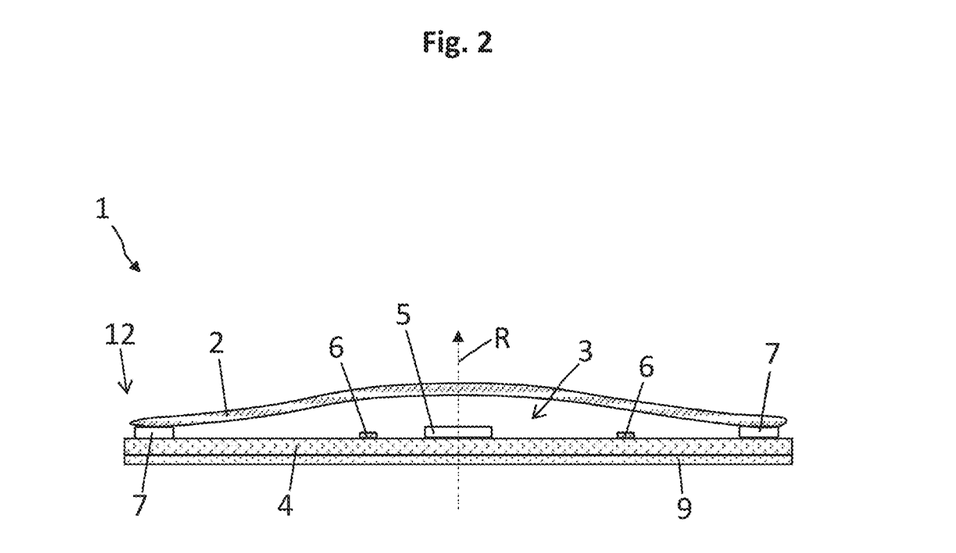

FIG. 2 shows another embodiment of the marking label 1, in which the carrier layer 4 of the RFID transponder 3 forms the weldable substrate for the top layer 2. The top layer 2 is welded to the inlay substrate of the RFID transponder 3 itself. This means that the marking label 1 can be made particularly flat. The top layer 2 and the backing layer 4, as well as the bottom layer 8 according to FIG. 1, are particularly preferably designed as a thin flexible film element, which are preferably also made of the same material. In this way, a reliable welded joint can be established and a flexible and particularly flat marking label can be designed.

Figure 3:
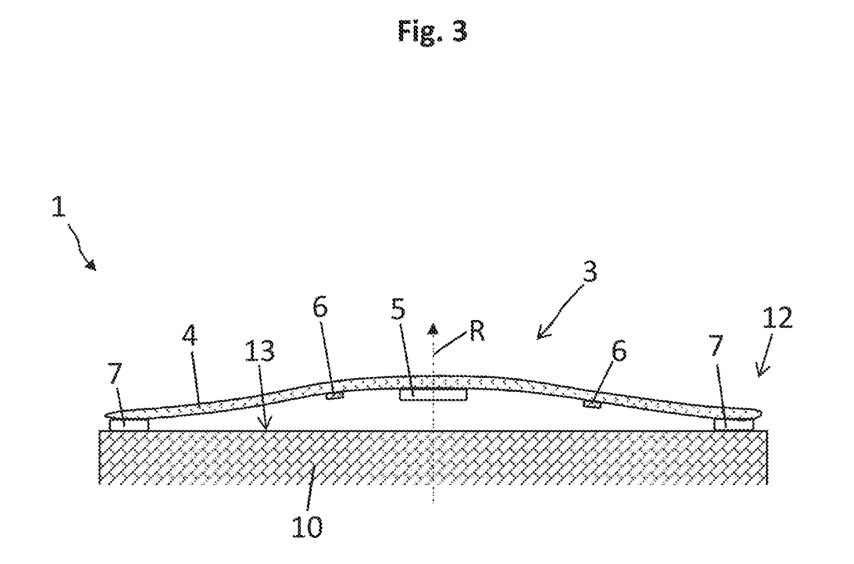

FIG. 3 shows another embodiment of the marking label 1, in which the substrate is provided by the surface 13 of the object 10 itself. The surface 13 provides a solid substrate, for example as the outer surface of a plastic injection mold, which can be welded to the sealing layer 2, 4. For example, as shown in FIG. 3, the sealing layer is realized by the carrier layer 4 of the RFID transponder 3, which is attached by welding at a predetermined position to a lateral surface of the plastic syringe, thereby forming the marking label 1. Alternatively, the object 10 can also realize a medication packaging or label that is attached to an injection vial or a vial. In each case, the surface 13 is set up as a substrate so that it can be welded to the sealing layer 2, 4.

Figure 4:
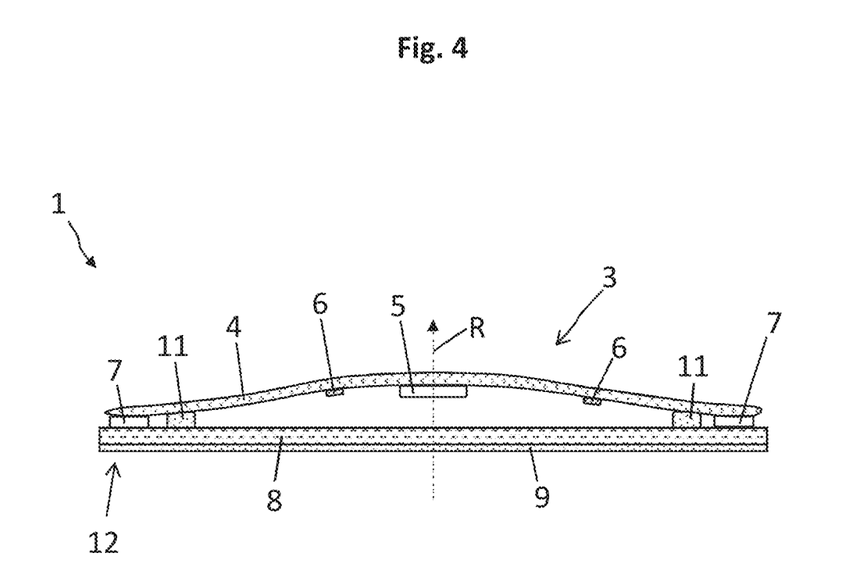

FIG. 4 illustrates a further embodiment of the marking label 1, in which it is indicated that the sealing layer 2, 4 can also be bonded to the substrate 4, 8, 13 by means of an adhesive layer 11. The adhesive layer 11 is preferably arranged inside the weld seam 7 so that it is also protected from external chemical and/or physical influences. In particular, the adhesive layer 11 can be used to position the sealing layer 2, 4 before it is bonded to the substrate 4, 8, 13 by welding.

Alternatively or additionally, the adhesive layer 11 or a further adhesive layer can be arranged outside the area of the weld seam 7 (see also FIG. 7) in order to bond the sealing layer 2, 4 with its adhesive edge areas to the substrate 4, 8, 13 and then form the weld seam 7 within the adhesive area. The adhesive layer 11 is shown as an example in FIG. 4 and can also be provided in the other embodiments. In particular, the adhesive layer 11 can also be formed over the entire surface of an underside of the sealing layer 2, 4 and serve to fix the inlay.

Figure 5:
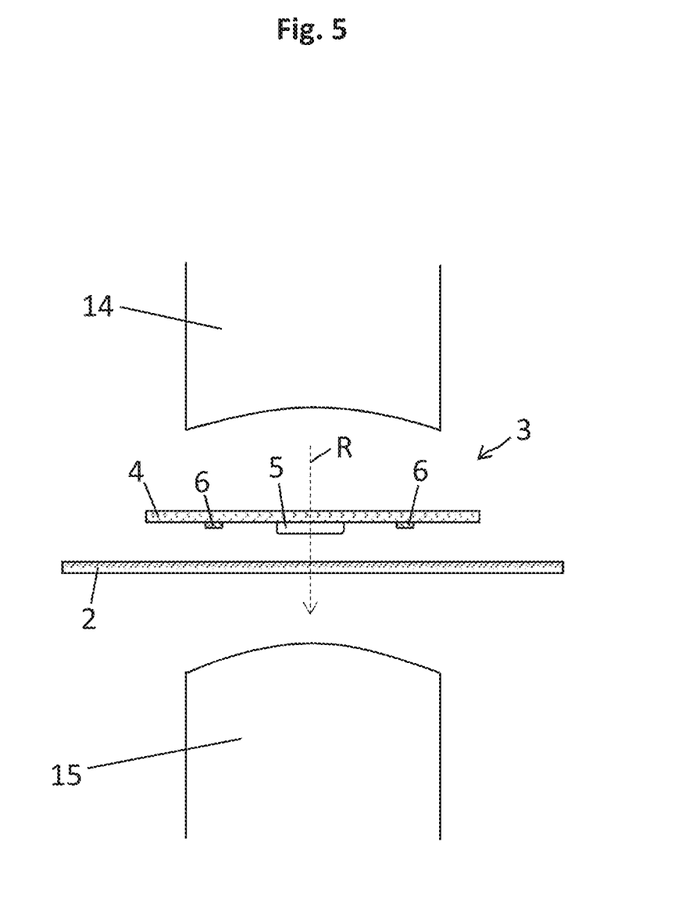
FIG. 5 an embodiment of a method step for forming a marking label according to FIGS. 1-4, FIGS. 6-7 embodiments of a marking label in a respective top view, FIGS. 8-10 various embodiments of a weld seam of the marking label in respective top views, and FIG. 11 a flowchart for a method for producing a marking label according to FIGS. 1-9.

FIG. 5 shows a schematic representation of how the marking label 1 can be formed by ultrasonic welding using a sonotrode 14 and an anvil 15. In this context, reference is made in particular to the following description of FIG. 10.

Figure 6:
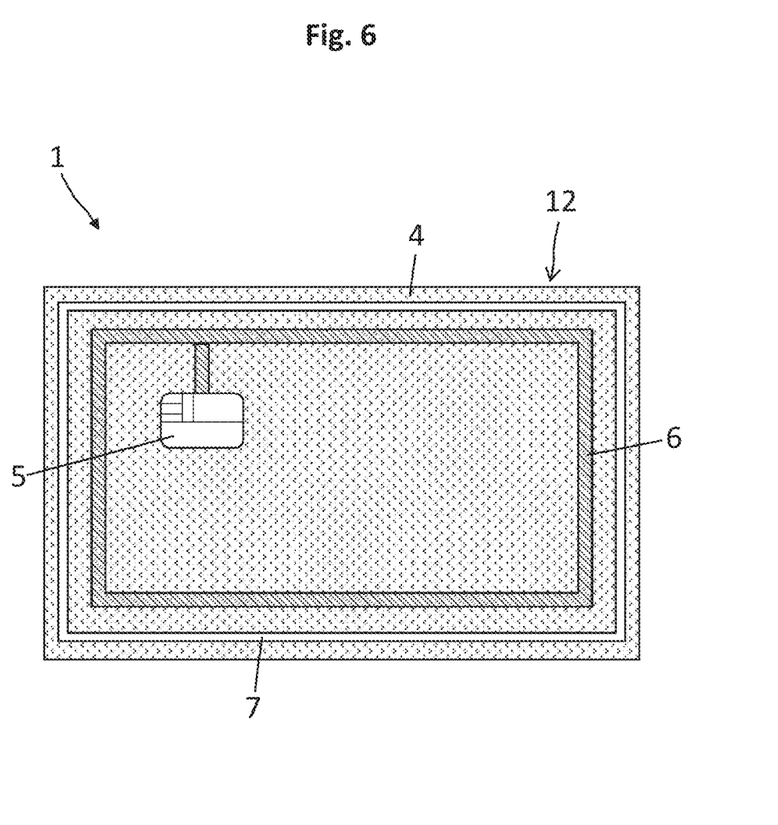

FIG. 6 shows a schematic view of the marking label 1. FIG. 6 shows that the antenna structure 6 is in the form of conductive tracks and is connected to the RFID chip 5. For example, the antenna structure 6 is printed on the carrier layer 4 in the form of copper, silver or aluminum tracks. The RFID chip 5 can also be applied to the carrier layer 4 using a printing process. Both the antenna structure 6 and the RFID chip 5 are surrounded by the weld seam 7, which encloses them laterally and, in particular, protects them against moisture ingress. Alternatively, only the RFID chip 5 can be surrounded by the weld seam 7. Alternatively, a further weld seam can also be formed so that the marking label 1 has at least one weld seam 7. For example, the RFID chip 5 can be surrounded by a weld seam 7 and also by a further weld seam 7, which also encloses the antenna structure 6. Accordingly, a particularly reliable and secure barrier against moisture ingress into the area of the antenna structure 6 and/or the RFID chip 5 can be created. The weld seam 7 can also be designed in such a way that it lies on the antenna structure 6 or crosses the antenna structure 6.

Figure 7:
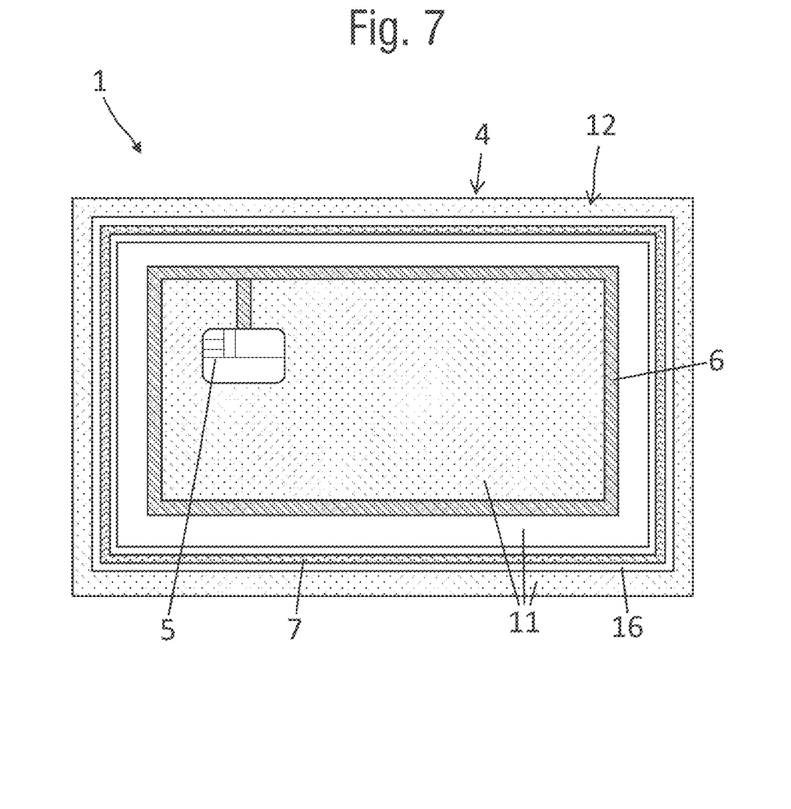

FIG. 7 shows a schematic top view of another embodiment of the marking label 1. The adhesive layer 11 can have a large surface area and have two separate adhesive sections that are spaced apart from each other. A non-adhesive area 16, which separates the two adhesive sections from each other, is located between the two adhesive sections of the adhesive layer 11. Accordingly, the adhesive layer 11 is recessed in the non-adhesive area 16; the non-adhesive area 16 provides a joining zone for forming the weld seam 7. According to the embodiment example illustrated in FIG. 7, the adhesive layer 11 is not contiguous and is arranged in the inner area of the RFID antenna structure 6 and in an outer edge area adjacent to the weld seam 7. The area 16 recessed by adhesive is adapted to the shape of the RFID antenna structure 6 and is essentially rectangular according to the embodiment example illustrated in FIG. 7.

Figure 8:
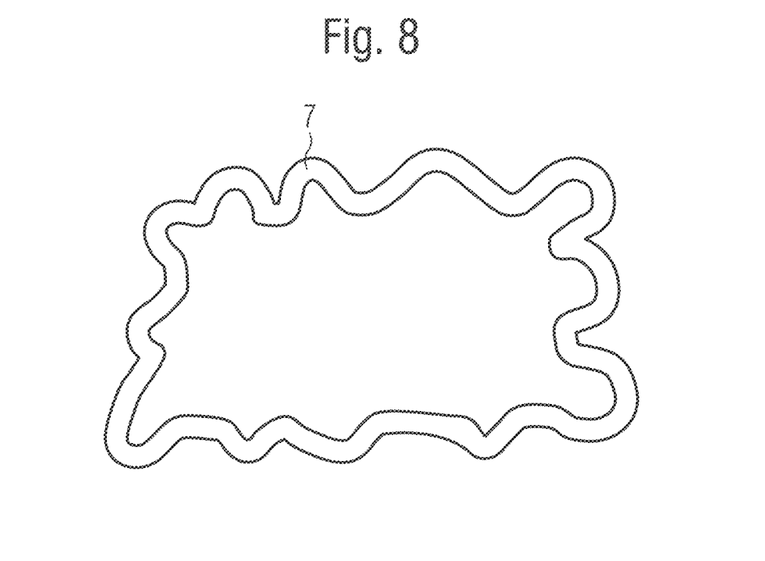
Figure 9:
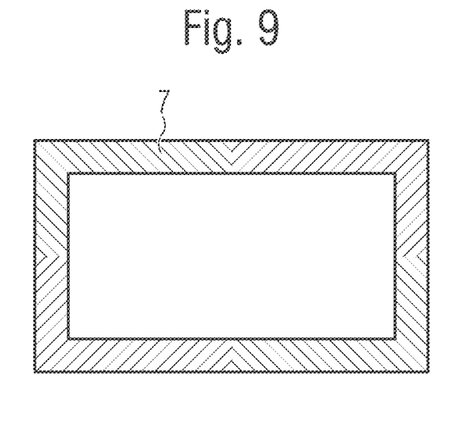
Figure 10:
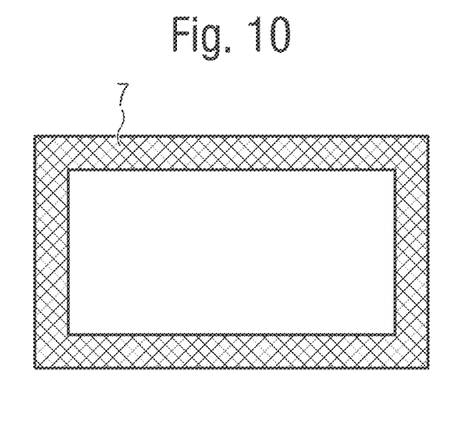

The weld seam 7 can also be formed with a predetermined 2D structure as shown in FIGS. 8-10. FIGS. 8-10 each show a schematic view of possible embodiments of the weld seam 7, which extends essentially within the main extension plane of the marking label 1. The weld seam 7 can have a wave structure or zigzag structure (see FIG. 8), a sunray structure (see FIG. 9) or a waffle structure (see FIG. 10). In each case, the weld seam 7 is specifically widened in order to increase the inherent rigidity of the welded joint compared to a narrow straight weld seam and to contribute to an improved rigidity of the marking label 1. Such designs of the weld seam also help to counteract undesirable wrinkling of the marking label 1 and enable subsequent distortion-free application of the marking label 1 on or to an object. The weld seam 7 can be formed in sections and have several starting and end points or can be closed in a single operation. Accordingly, the illustrated line sections in FIGS. 9 and 10 can realize a respective weld seam that coherently forms the illustrated weld seam 7 in the form of a frame or at least contributes to it.

Figure 11:
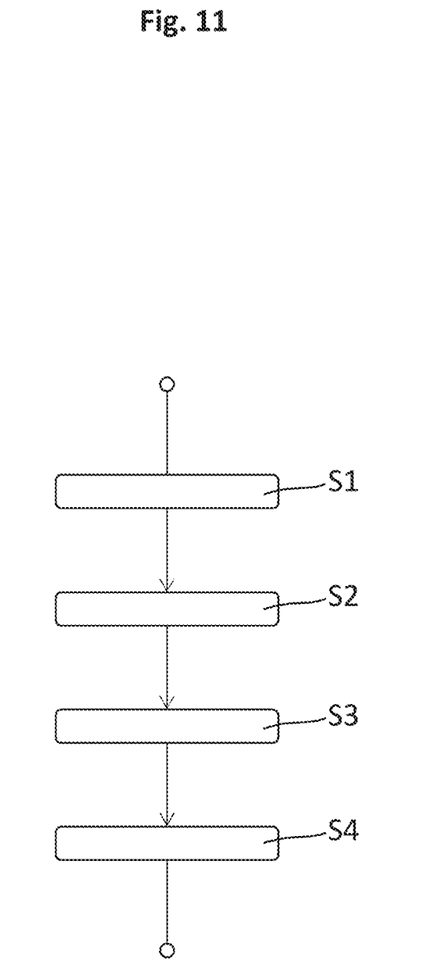

FIG. 11 shows a flowchart for a method for manufacturing an embodiment of the marking label 1. Manufacturing can be carried out, for example, by means of ultrasonic welding in accordance with the device shown in FIG. 5.

In a step S1, components for the marking label 1 are provided. The RFID transponder 3 is provided with the RFID chip 5, the antenna structure 6 and the carrier layer 4, on which the RFID chip 5 and the antenna structure 6 are arranged. Furthermore, the sealing layer is provided in the form of the top layer 2.

In a further step S2, the RFID transponder 3 and the top layer 2 are positioned relative to each other so that the RFID chip 5 and/or the antenna structure 6 are arranged between the top layer 2 and the carrier layer 4.

In a further step S3, the weld seam 7 is formed by means of ultrasonic welding. The sonotrode 14 and the anvil 15 are guided towards each other and brought into contact so that the top layer 2 and the backing layer 4 are pressed against each other and fused. The sonotrode 14 can, for example, strike the anvil 15 like a hammer so that the top layer 2 and the backing layer 4 are bonded by means of longitudinal ultrasonic welding. Alternatively or additionally, the sonotrode 14 can rub against the anvil 15 so that the top layer 2 and the backing layer 4 are bonded by means of torsional ultrasonic welding. By forming the weld seam 7, the RFID chip 5 and/or the antenna structure 6 are surrounded by the weld seam 7 and enclosed between the top layer 2 and the backing layer 4 (see FIGS. 2 and 4).

Alternatively or additionally, the weld seam 7 can be formed by means of thermal welding and/or laser welding and/or sealing.

In a step S4, a punching process and/or a cutting process can be carried out in order to form an outer contour of the marking label 1. Preferably, steps S3 and S4 can be carried out in one operation. For example, the welding of the top layer 2 to the backing layer 4 can be carried out in combination with punching and/or laser cutting.

Using the device illustrated in FIG. 5, the weld seam 7 can also be formed with a predetermined 3D contour in order to introduce a basic radius into the marking label 1 and form it with a predetermined curvature. The sonotrode 14 and the anvil 15 have complementary curvature surfaces at the working contacts, which face each other during operation. Thus, the weld seam 7 can be formed with a predetermined curvature in relation to the stacking direction R, thereby forming the marking label 1 with a predetermined curvature in relation to its main extension plane.

The shape or working surfaces of the sonotrode 14 and the anvil 15 are preferably selected such that they correspond to an outer shape of the object 10, for example a lateral surface of a syringe, to which the marking label 1 is to be attached. Compared to a flat label that is to be applied to a curved surface, restoring forces that would force the marking label 1 into a flat position are reduced. This makes it particularly easy to apply the marking label 1 to the syringe and also contributes to an improved hold on the syringe.

The marking label 1 can be formed continuously, in particular by means of one or more material webs, so that a large number of marking labels 1 can be produced easily and cost-effectively.

By welding the upper material and the lower material of the marking label 1 together, the RFID inlay is encapsulated within them and protected from moisture. The upper material or the upper layer 2 can be welded directly to the inlay substrate or the carrier layer 4 of the RFID transponder 3 itself. According to a further embodiment, the upper material can be welded to a lower cover layer or the bottom layer 8. In both cases, a completely enclosed space is created that protects the RFID chip 5, the antenna structure 6 and any adhesive points 11 from moisture. Furthermore, only local welding directly around the RFID chip 5 or around the antenna structure 6 is also possible. In particular, local welding can be carried out along the edge of the label 12 in the geometry of the label format.

LIST OF REFERENCE SIGNS 1 marking label
2 sealing layer/top layer
3 RFID transponder
4 sealing layer/substrate/carrier layer of the RFID transponder
5 RFID chip of the RFID transponder
6 antenna structure of the RFID transponder
7 weld seam
8 substrate/underlayer
9 adhesive layer
10 object
11 adhesive layer
12 label edge
13 substrate/surface of the object
14 sonotrode
15 anvil
16 adhesive-free area/joining zone
R stacking direction of the marking label
S(i) steps of a method for producing a marking label

The invention claimed is:

1. A marking label (1), comprising:
    an RFID transponder (3) with an RFID chip (5) and an antenna structure (6) which are coupled to one another by signal technology, and
    a sealing layer (2, 4) formed as a flexible film element which covers the RFID transponder (3) and which is bonded to a substrate (4, 8, 13) by means of welding, so that the RFID chip (5) and/or the antenna structure (6) is surrounded by a weld seam (7) and enclosed between the sealing layer (2, 4) and the substrate (4, 8, 13).

2. The marking label (1) according to claim 1, wherein the RFID transponder (3) comprises a carrier layer (4) on which the RFID chip (5) and the antenna structure (6) are arranged, and in which the carrier layer (4) forms the sealing layer, which is bonded to the substrate (8, 13) by means of the weld seam (7).

3. The marking label (1) according to claim 1, wherein the RFID transponder (3) comprises a carrier layer (4) on which the RFID chip (5) and the antenna structure (6) are arranged, and in which the carrier layer (4) forms the substrate to which the sealing layer (2) is bonded by means of the weld seam (7).

4. The marking label (1) according to claim 1, further comprising:
    an underlayer (8) which forms the substrate to which the sealing layer (2, 4) is bonded by means of the weld seam (7).

5. The marking label (1) according to claim 1, wherein the sealing layer (2, 4) is bonded to the substrate (4, 8, 13) by means of an adhesive layer (11), so that the adhesive layer (11) is at least partially surrounded by the weld seam (7) inside the latter and enclosed between the sealing layer (2, 4) and the substrate (4, 8, 13).

6. The marking label (1) according to claim 1, wherein the weld seam (7) is formed with a predetermined width in the range from 0.2 mm to 10 mm inclusive, relative to a main extension plane of the marking label (1).

7. The marking label (1) according to claim 1, wherein the weld seam (7) is formed with a predetermined structural course with respect to a main extension plane of the marking label (1) and has a wave structure, a zigzag structure and/or a waffle structure.

8. The marking label (1) according to claim 1, wherein the weld seam (7) is formed locally or circumferentially around the RFID chip (5) and/or the antenna structure (6).

9. The marking label (1) according to claim 1, wherein the sealing layer (2, 4) and/or the substrate (4, 8, 13) are pre-bent and connected to each other in a materially bonding manner by means of the weld seam (7), so that the marking label (1) forms a predetermined curved marking medium.

10. The marking label (1) according to claim 1, further comprising:
    a film element which is coupled to the RFID transponder (3), to the sealing layer (2, 4) and/or to the substrate (4, 8, 13) and which is set up to counteract moisture absorption into the enclosed area with the RFID chip (5) and/or the antenna structure (6).

11. The marking label (1) according to claim 1, further comprising:
    a functional element which is coupled to the RFID transponder (3), to the sealing layer (2, 4) and/or to the substrate (4, 8, 13) and which is adapted to form a mechanical protection for the RFID chip (5) and/or the antenna structure (6).

12. The marking label (1) according to claim 11, wherein the functional element comprises a non-woven layer and/or a foam and/or a rubber element.

13. The marking label (1) according to claim 1,
    wherein the sealing layer (2, 4) and/or the substrate (4, 8, 13) is formed as a transparent film element.

14. A marking system, comprising:
    an object (10), and
    the marking label (1) according to claim 1, which is coupled to the object (10).

15. The marking system according to claim 14, wherein a surface (13) of the object (10) forms the substrate with which the sealing layer (2, 4) of the marking label (1) is bonded by means of the weld seam (7).

16. A method for producing a marking label (1), comprising:
    providing an RFID transponder (3) with an RFID chip (5) and an antenna structure (6), which are coupled to one another by means of signal technology,
    providing a sealing layer (2, 4) formed as a flexible film element,
    attaching the RFID transponder (3) and the sealing layer (2) to a substrate (4, 8, 13) so that the RFID chip (5) and/or the antenna structure (6) is arranged between the sealing layer (2, 4) and the substrate (4, 8, 13), and
    forming a weld seam (7) by welding the sealing layer (2, 4), so that the RFID chip (5) and/or the antenna structure (6) is surrounded by the weld seam (7) and enclosed between the sealing layer (2, 4) and the substrate (4, 8, 13).

17. The method according to claim 16, wherein the weld seam (7) is formed by means of ultrasonic welding, thermal welding and/or laser welding.

18. The method according to claim 16, wherein the weld seam (7) is carried out by means of a sonotrode (14) and an anvil (15), which have complementary curvature surfaces facing each other according to operation, so that the weld seam (7) is formed with a predetermined curvature with respect to a stacking direction (R) of the marking label (1) and thereby the marking label (1) is formed with a predetermined curvature with respect to its main extension plane.

19. The method according to claim 16, further comprising:
    providing the substrate to which the sealing layer (2, 4) is welded in the form of a carrier layer (4) of the RFID transponder (3) and/or in the form of an underlayer (8) and/or in the form of a surface (13) of an object (10) to be marked with the marking label (1).

20. A method for producing a marking label (1), comprising:
    providing an RFID transponder (3) with an RFID chip (5) and an antenna structure (6), which are coupled to one another by means of signal technology,
    providing a sealing layer (2, 4),
    attaching the RFID transponder (3) and the sealing layer (2) to a substrate (4, 8, 13) so that the RFID chip (5) and/or the antenna structure (6) is arranged between the sealing layer (2, 4) and the substrate (4, 8, 13),
    forming a weld seam (7) by welding the sealing layer (2, 4), so that the RFID chip (5) and/or the antenna structure (6) is surrounded by the weld seam (7) and enclosed between the sealing layer (2, 4) and the substrate (4, 8, 13), and
    performing a punching operation and/or a cutting operation and forming an outer contour of the marking label (1), wherein the welding of the sealing layer (2, 4) and the punching operation and/or the cutting operation are performed in one step.

* * * * *